(12) United States Patent
Ino et al.

(10) Patent No.: US 7,219,652 B2
(45) Date of Patent: May 22, 2007

(54) BEARING SUPPORT DEVICE

(75) Inventors: Masao Ino, Toyota (JP); Toshio Hayashi, Obu (JP); Tetsuji Yamanaka, Obu (JP)

(73) Assignee: Denso Corporation (JP)

( * ) Notice: Subject to any disclaimer, the term of this patent is extended or adjusted under 35 U.S.C. 154(b) by 313 days.

(21) Appl. No.: 11/066,290

(22) Filed: Feb. 28, 2005

(65) Prior Publication Data
US 2005/0189513 A1 Sep. 1, 2005

(30) Foreign Application Priority Data
Mar. 1, 2004 (JP) .............................. 2004-056718

(51) Int. Cl.
*F02D 9/08* (2006.01)
*F16K 1/02* (2006.01)
*F02D 9/10* (2006.01)

(52) U.S. Cl. ..................... 123/337; 123/336; 251/308

(58) Field of Classification Search ............... 123/336, 123/337, 361, 399, 184.61; 251/304–309; 384/275, 297
See application file for complete search history.

(56) References Cited

U.S. PATENT DOCUMENTS

| 3,471,121 | A | * | 10/1969 | Geiselman | 251/308 |
| 4,294,428 | A | * | 10/1981 | Okada et al. | 251/307 |
| 4,604,254 | A | * | 8/1986 | Yamamoto et al. | 251/308 |
| 4,800,915 | A | * | 1/1989 | Hormel | 251/308 |
| 5,875,758 | A | | 3/1999 | Fujita | 123/336 |
| 6,612,325 | B2 | * | 9/2003 | Rentschler et al. | 123/336 |
| 6,763,802 | B1 | * | 7/2004 | Brassell | 123/336 |
| 6,837,261 | B2 | * | 1/2005 | Rentschler et al. | 251/308 |
| 6,895,926 | B1 | * | 5/2005 | Moreau et al. | 123/336 |
| 7,011,072 | B2 | * | 3/2006 | Nicholas | 123/336 |

FOREIGN PATENT DOCUMENTS

| GB | 2 391 907 A | 2/2004 |
| JP | 7-166877 | 6/1995 |
| JP | 2002-317718 | 10/2002 |
| JP | 2003172357 A * | 6/2003 ............... 251/308 |

* cited by examiner

Primary Examiner—Willis R. Wolfe, Jr.
(74) Attorney, Agent, or Firm—Nixon & Vanderhye PC

(57) ABSTRACT

A bearing support device includes a rotor, a bearing member, and a bearing holding member. The rotor rotates about a rotation center axis. The bearing member rotatably supports the rotor within a bearing hole passing through the bearing member. The bearing holding member holds the bearing member in a secure manner within a fitting hole that passes through the bearing holding member along the center axis of the rotor via an engagement force produced by tightly fitting the bearing member. The rotor and bearing member are made of a resin. An engagement section is provided for tightly fitting the bearing member into the fitting hole relative to the bearing hole to enable an engagement force produced by the tight fitting to act in a direction that does not affect an inner diameter dimension of the bearing hole.

17 Claims, 8 Drawing Sheets

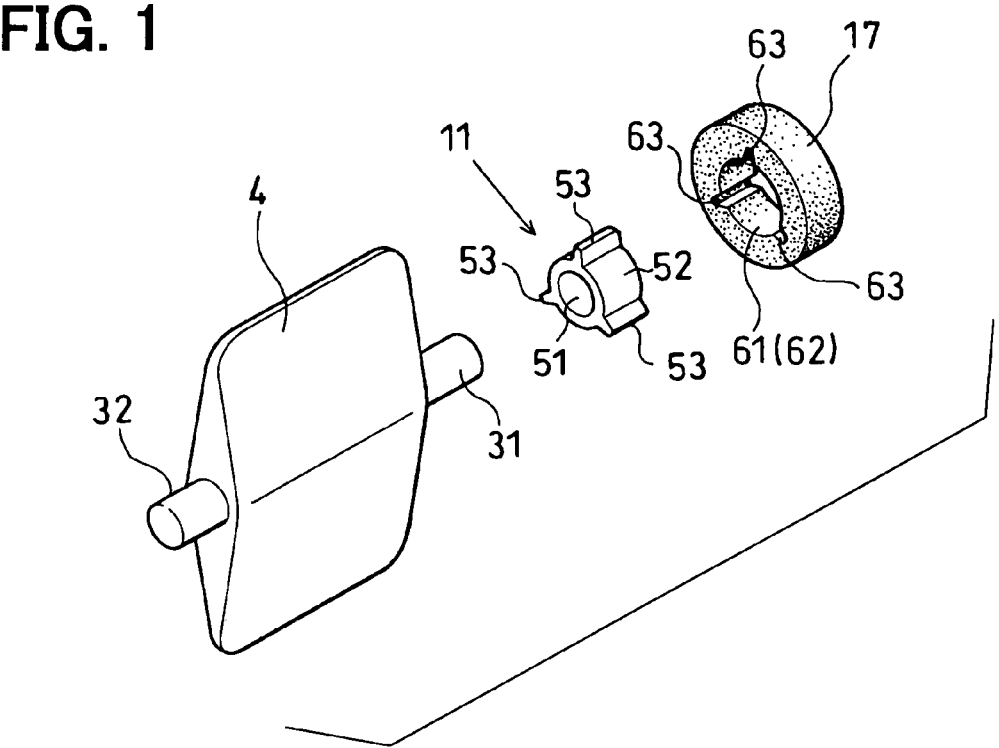
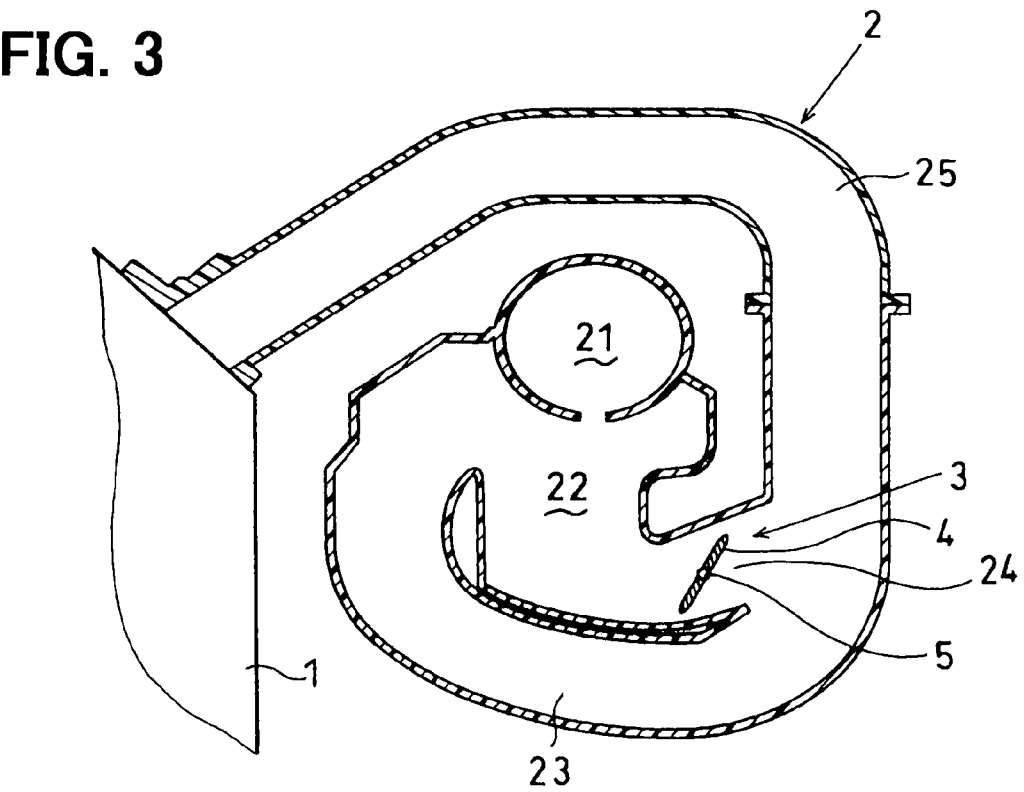

BEARING SUPPORT DEVICE

CROSS REFERENCE TO RELATED APPLICATIONS

This application is based upon and claims the benefit of priority of Japanese Patent Application No. 2004-56718, filed on Mar. 1, 2004, the contents of which are incorporated herein by reference.

FIELD OF THE INVENTION

The present invention relates to a bearing support device for supporting a rotor in a freely rotatable manner and, more particularly, to a valve bearing support device for supporting multiple integrated butterfly valves that alter the length or cross-sectional area of intake air passages formed within a resin intake manifold of an engine mounted in a vehicle.

BACKGROUND OF THE INVENTION

Conventionally, variable intake systems include technology for switching the length or cross-sectional area of an intake pipe of a multiple cylinder engine between two stages according to factors such as the engine speed and the engine load. The systems apply an inertia supercharging effect or resonance supercharging effect to the intake air to improve the output of the multiple cylinder engine. Examples of such systems are disclosed in Japanese Patent Laid-Open Publication No. Hei 07-166877 at pages 1 to 5, FIG. 1 through FIG. 7; Japanese Patent Laid-Open Publication No. Hei 08-277717 at pages 1 to 9, FIG. 1 through FIG. 9; and Japanese Patent Application No. 2002-317718 at pages 1 to 4, FIG. 1 through FIG. 7. In such a variable intake system, as shown in FIG. 9 and FIG. 11, a butterfly valve bearing support structure that supports multiple integrated butterfly valves 104 in a freely rotatable manner (a conventional embodiment) is provided in a valve bearing section 103 of an intake manifold 102, and switches the length or cross-sectional area of intake air passages 101 connecting to each cylinder in a multiple cylinder engine.

Here, the butterfly valves 104 are supported by a single valve shaft 105 with a rotation center axis oriented in a direction orthogonal to the center axis direction of the intake air passages 101. Furthermore, opening and closing control of the butterfly valves 104 is performed by an actuator 110 to rotationally drive the valve shaft 105. A valve axis (effectively, a bearing section) 106 which covers the outer periphery of the valve shaft 105 is formed in an integrated manner at each end, in the rotation center axis direction, of each butterfly valve 104. Furthermore, the end of the valve shaft 105 nearest the actuator 110 is supported by a bearing 107 or the like, for example.

In recent years, from the viewpoints of reducing weight and improving the insulation efficiency and the level of design freedom, various trials and proposals have arisen regarding the use of a resin to form the intake manifold 102 and the butterfly valves 104, for example. However, when the components of the intake system of an engine are made of a resin, the level of molding precision is lower than that observed for metallic materials. Consequently, if there is little bearing clearance between the inner circumferential surface of the valve bearing section 103 of the resin intake manifold 102 and the outer circumferential surface of the valve axis 106 of the resin butterfly valve 104, then the sliding resistance between the valve bearing section 103 and the valve axis 106 increases. To suppress this increase in sliding resistance, it is necessary to ensure a large bearing clearance between the valve bearing section 103 and the valve axis 106. As a result, the end of the valve shaft 105 and the valve axis 106 on the opposite side to the actuator (the left side in the diagram) is a free edge, the movement of which, in a radial direction orthogonal to the rotation center axis direction, is not constrained by the valve bearing section 103.

However, intake air, which flows through the plurality of intake air passages 101, includes pulsation introduced by the rotation of the engine. Consequently, this pulsation causes each of the butterfly valves 104 provided in one of the plurality of intake air passages 101 to vibrate. In particular, when the intake pressure which accompanies the pulsation acts on the butterfly valve 104 on the opposite side to the actuator, namely, the side with the free edge, the end of the valve shaft 105 on the opposite side to the actuator undergoes a large amount of vibration. As a result, the collision speed increases between the valve bearing section 103 of the resin intake manifold 102 and the valve axis 106 of the resin butterfly valve 104. Furthermore, the outer circumference of the valve shaft 105 is covered by the valve axis 106 of the resin butterfly valve 104. Consequently, at the end of the valve shaft 105 on the opposite side to the actuator, contact occurs between the valve bearing section 103 of the resin intake manifold 102 and the valve axis 106 of the resin butterfly valve 104.

In regions where components made of a resin material contact each other, the critical PV value, which indicates slipperiness, is low. Consequently, the slidability between the valve bearing section 103 of the resin intake manifold 102 and the valve axis 106 of the resin butterfly valve 104 worsens, resulting in an extremely large amount of abrasion (see FIG. 5). As the abrasion between the valve bearing section 103 of the resin intake manifold 102 and the valve axis 106 of the resin butterfly valve 104 progresses, the bearing clearance between the valve bearing section 103 of the resin intake manifold 102 and the valve axis 106 of the resin butterfly valve 104 increases. As a result, rocking of the valve shaft 105 accompanying vibration increases, and the collision speed of the valve bearing section 103 with the valve axis 106 increases further, leading to a problem of abnormal noise generation.

Therefore, with an object of improving abrasion resistance between the valve bearing section 103 of the resin intake manifold 102 and the valve axis 106 of the resin butterfly valve 104, the inventors of the present invention have already filed Japanese Patent Application No. 2002-219765 on Jul. 29, 2002. Japanese Patent Application No. 2002-219765 discloses the bearing hole 111 side of the valve bearing section 103 of the resin intake manifold 102 being replaced with a metal sleeve 112, as shown in FIG. 10 and FIG. 12. However, because the bearing structure comprises both parts made of a metal and parts made of a resin, the level of tapping noise generated at the bearing clearance between the inner circumferential surface of the metal sleeve 112 and the outer circumferential surface of the valve axis 106 of the resin butterfly valve 104 is higher than in a bearing structure comprising only parts made of a resin, and it is therefore necessary to reduce the bearing clearance.

As a result, reducing the bearing clearance between the inner circumferential surface of the metal sleeve 112 and the outer circumferential surface of the valve axis 106 of the resin butterfly valve 104 causes the slidability and abrasion resistance between the metal sleeve 112 and the valve axis 106 of the butterfly valve 104 to deteriorate. As a countermeasure, the metal sleeve 112 is bonded to the valve bearing section 103 via an elastic body (such as fused rubber) 113. However, in this type of a butterfly valve bearing support structure (a related embodiment), the number of components and the number of assembly steps increases, which may result in lower productivity and higher costs.

SUMMARY OF THE INVENTION

An object of the present invention is to provide a bearing support device which, by simply fitting a bearing member into a fitting hole of a bearing holding member, enables the circularity and concentricity of the bearing hole of the bearing member to be favorably maintained, even in a bearing structure comprising components that are made of resin materials with a comparatively low molding precision, thereby enabling both improved slidability between the rotor and the bearing member, and improved reliability. Another object is to provide a bearing support device which is easier to assemble and enables improved productivity by enabling centering of the bearing hole of the bearing member at the same time that the bearing member is fitted within the fitting hole of the bearing holding member.

The invention includes a bearing structure in which a rotor and a bearing member are both made of a resin, wherein the components are made of resin materials with a comparatively low level of molding precision. Furthermore, by providing an engagement section, for tightly fitting the bearing member with a bearing hole into a fitting hole of a bearing holding member, in a positional relationship relative to the bearing hole that enables the engagement force produced by the tight fitting to act in a direction that does not affect the inner diameter dimensions of the bearing hole of the bearing member, the circularity and concentricity of the bearing hole of the bearing member can be favorably maintained by simply fitting the bearing member into the fitting hole of a bearing holding member, even in a bearing structure comprising components that are made of resin materials with a comparatively low molding precision, thereby enabling both improved slidability between the rotor and the bearing member, and improved reliability. Furthermore, because the bearing member can be secured and held by simply fitting the bearing member into the fitting hole of the bearing holding member, and using the engagement force produced by the tight fit of the bearing member inside the fitting hole of the bearing holding member, the assembly operation is simple, only a small number of parts is required, and improved productivity and reduced costs can be realized.

In another aspect of the invention, the engagement section for tightly fitting the bearing member with the bearing hole into the fitting hole of the bearing holding member may be provided in a positional relationship relative to the bearing hole that enables the orientation of the engagement stress, which is generated within the bearing member when the bearing member is fitted tightly into the fitting hole of the bearing holding member, to occur in substantially the circumferential direction of the bearing member, away from the radial inner diameter of the bearing member. In this aspect, as with the aspect above, deterioration in the circularity of the bearing hole of the bearing member, caused by the engagement stress that is generated in the bearing member when the bearing member is fitted tightly into the fitting hole of the bearing holding member, can be prevented. Accordingly, even in a bearing structure comprising components that are made of resin materials with a comparatively low molding precision, the bearing clearance between the inner diameter surface of the bearing member and the outer diameter surface of the rotor can be substantially reduced, and deterioration in the slidability and abrasion resistance between the bearing member and the rotor can be prevented.

In another aspect of the present invention, a bearing section inside which is formed a bearing hole, and an engagement protrusion formed so as to protrude outward from the outside wall surface of the bearing section, may be provided on the bearing member. Furthermore, an engagement hole section for clearance fitting of the bearing section, and an engagement depression for tightly fitting the engagement protrusion may be provided in the fitting hole of the bearing holding member. In this aspect, as with the aspects above, deterioration in the circularity of the bearing hole and the concentricity of the bearing section can be prevented by providing the engagement section for tightly fitting the engagement protrusion into the engagement depression in a positional relationship that enables the engagement force exerted by the tight fitting to act in a direction that does not affect the inner diameter dimensions of the bearing hole of the bearing member.

In another aspect of the present invention, the engagement section for tightly fitting the engagement protrusion of the bearing member into the engagement depression of the fitting hole of the bearing holding member may be provided in such a positional relationship that ensures that the engagement protrusion and the engagement depression are in surface contact, line contact, or point contact. In order to prevent relative movement between the engagement protrusion and the engagement depression, that is, prevent the engagement protrusion from disengaging from the engagement depression, an elastic hook, which simplifies the insertion process by undergoing elastic deformation when the engagement protrusion is inserted in the engagement depression, and catches or engages on the engagement protrusion or the engagement depression at the point where the engagement protrusion is completely inserted in the engagement depression, may be formed in an integrated manner on either the engagement protrusion or the engagement depression. The elastic hook can be formed relatively cheaply by integrated molding from a resin.

In another aspect of the present invention, the bearing section of the bearing member is formed with a substantially circular cylindrical cross-sectional shape, and the engagement hole section of the fitting hole of the bearing holding member is formed in a substantially circular shape, which corresponds with the cross-sectional shape of the bearing section. Furthermore, the external shape of the engagement protrusion, formed so as to protrude radially outward from the outer diameter surface of the bearing section of the bearing member, may be formed in a tapered shape that tapers in a radially outward direction from the outer diameter surface of the bearing section. Furthermore, the shape of the engagement depression, formed so as to protrude radially outward from the inner diameter surface of the engagement hole section of the bearing holding member may be formed in a tapered shape that tapers with increasing depth from an opening positioned at the inner diameter surface of the engagement hole section. In this aspect, by simply tightly fitting the engagement protrusion of the bearing member into the engagement depression of the fitting hole of the bearing holding member, the bearing member can be held firmly in a secured manner in the fitting hole of the bearing holding member, without affecting the inner diameter dimensions of the bearing hole formed in the bearing section of the bearing member.

In another aspect of the present invention, the engagement protrusion described above may be formed in a tapered shape that tapers towards the direction of insertion of the bearing member into the bearing holding member. Furthermore, the engagement depression described above may be formed in a tapered shape that tapers from an opening positioned at one end face of the bearing holding member towards an opening positioned on the opposite end face of the bearing holding member. In this aspect, the further the engagement protrusion of the bearing member is inserted into the engagement depression of the fitting hole of the bearing holding member, the more firmly the bearing member can be held in a secured manner within the fitting hole of the bearing holding member, without affecting the inner diameter dimensions of the bearing hole formed in the bearing section of the bearing member.

In another aspect of the present invention, the bearing hole of the bearing member is formed in a circular shape, which corresponds with the cross-sectional shape of the rotor. Furthermore, two or more of the engagement protrusions and the engagement depressions are provided in positions outward from the radial direction of the bearing hole formed in the bearing section of the bearing member, at predetermined intervals around the circumferential direction, so as to surround the bearing hole. Consequently, when the engagement protrusions of the bearing member are fitted tightly into the engagement depressions of the fitting hole of the bearing holding member, it is possible to substantially align the center axis of the bearing hole formed in the bearing section of the bearing member with the rotation center axis of the rotor. In other words, centering of the bearing section of the bearing member and the bearing hole can be achieved at the same time that the engagement protrusions of the bearing member are fitted into the engagement depressions of the fitting hole of the bearing holding member, and consequently, the assembly process is simplified, and productivity can be improved.

In another aspect of the present invention, by providing a bearing contact section for contacting the inner diameter surface of the bearing hole formed in the bearing member, at one end in the rotation axis direction of the rotor, the rotor can rotate smoothly within the bearing hole formed in the bearing member, even when a method is employed where the rotor is driven using a polygonal shaft, by having the bearing contact section of the rotor in contact with the inner diameter surface of the bearing hole formed in the bearing member. In this aspect, the cross-sectional shape of the bearing contact section of the rotor is preferably formed in a circular cylindrical shape that corresponds with the shape of the bearing hole. Furthermore, by forming a shaft through hole in the rotor, through which the polygonal shaft passes in the rotation center axis direction, and forming this shaft through hole with substantially the same cross-sectional shape as that of the polygonal shaft, the relative rotation of the rotor and the polygonal shaft can be restricted.

In yet another aspect of the present invention, a composite material resin system produced by mixing or adding a low sliding resistance material, capable of reducing sliding resistance during relative movement between the rotor and the bearing member, to a resin material that has been converted to a molten state by heating (for example a molten resin comprising a thermoplastic resin) may be used as the material for the integrated resin molding of the bearing member. Furthermore, the resin bearing member may be manufactured by injection molding of this composite material resin system. In this aspect, the slidability between the rotor and the bearing member can be further improved, and the abrasion resistance of the rotor and the bearing member can be improved. Furthermore, by using the comparatively expensive low sliding resistance material only around the periphery of the inner diameter surface of the bearing hole formed in the bearing member, cost increases can be suppressed.

In still another aspect of the present invention, by using a low sliding resistance material for reducing the sliding resistance between the outer diameter surface of the rotor and the inner diameter surface of the bearing hole formed in the bearing member during relative movement of the rotor and the bearing member, the slidability between the rotor and the bearing member can be further improved, and the abrasion resistance of the rotor and the bearing member can also be improved. Furthermore, by applying the relatively expensive low sliding resistance material only between the outer diameter surface of the rotor and the inner diameter surface of the bearing hole, cost increases can be suppressed.

In still another aspect of the present invention, the bearing holding member may be formed as an integrated unit from a thermoplastic resin, and the bearing member may be formed as an integrated unit from the same resin material as that used for the bearing holding member. The resin material used to mold the bearing member as an integrated unit is preferably a composite material resin system produced by mixing or adding a low sliding resistance material, capable of reducing sliding resistance during relative movement between the rotor and the bearing member, to a resin material that has been converted to a molten state by heating (for example a molten resin comprising a thermoplastic resin).

In still another aspect of the present invention, the bearing holding member is formed from a thermoplastic resin as an integrated unit, and is provided as an integrated part of the resin intake manifold, the resin throttle body, the resin engine intake pipes, or the resin housing. The bearing holding member may be provided as a separate body from the resin intake manifold, the resin throttle body, the resin engine intake pipes, or the resin housing, but may also be integrated within the resin intake manifold, the resin throttle body, the resin engine intake pipes, or the resin housing, that is, formed as an integrated part of the resin intake manifold, the resin throttle body, the resin engine intake pipes, or the resin housing.

In still another aspect of the present invention, the rotor supported in a freely rotatable manner by the bearing holding member via the bearing member may comprise multiple integrated butterfly valves for altering the passage length or cross-sectional area of each intake air passage connected to a cylinder of a multiple cylinder engine. Furthermore, the rotor supported in a freely rotatable manner by the bearing holding member via the bearing member may comprise a butterfly valve or the like for altering the volume of intake air taken into the cylinders of the engine. Further yet, the rotor supported in a freely rotatable manner by the bearing holding member via the bearing member may comprise a butterfly valve or the like for generating a swirl flow or a tumble flow within the intake air taken into the combustion chamber from the intake ports of the engine.

Other features and advantages of the present invention will be appreciated, as well as methods of operation and the function of the related parts from a study of the following detailed description, appended claims, and drawings, all of which form a part of this application. In the drawings:

BRIEF DESCRIPTION OF THE DRAWINGS

FIG. 1 is an exploded view of a butterfly valve bearing support structure of the present invention;

FIG. 3 is a cross-sectional view of an intake manifold for an engine including the butterfly valve bearing support structure of FIG. 1;

DETAILED DESCRIPTION OF THE PREFERRED EMBODIMENTS

In a best mode for carrying out the invention, the objective of maintaining favorable circularity and concentricity for a bearing hole of a bearing member, even for bearing structures in which the components are formed from a resin material with a comparatively low molding precision, is realized by providing an engagement section, for tightly fitting the bearing member with the bearing hole into a fitting hole of a bearing holding member, in a positional relationship relative to the bearing hole that enables the engagement force produced by the tight fitting to act in a direction that does not affect the inner diameter dimensions of the bearing hole of the bearing member.

Figure 2:
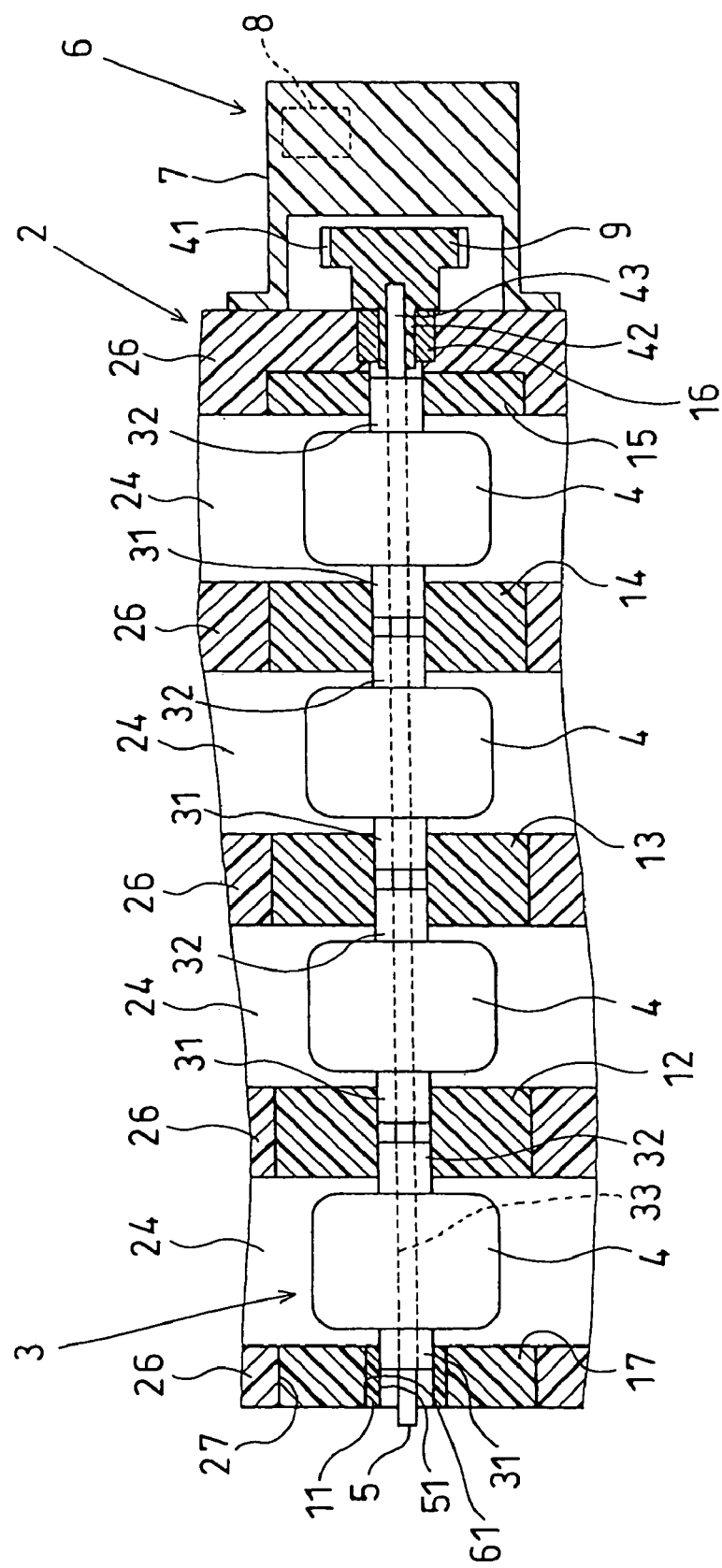
FIG. 2 is a cross-sectional view of a variable intake system of an engine including the butterfly valve bearing support structure of FIG. 1.

FIG. 1 through FIG. 5 show a first embodiment of the present invention, wherein FIG. 1 shows the construction of a butterfly valve bearing support structure, FIG. 2 shows a variable intake system, and FIG. 3 shows an intake manifold.

The variable intake system of the present embodiment is provided in an intake system of an internal combustion engine (hereafter, referred to as an engine) 1, such as a multiple (in this case four) cylinder gasoline engine, installed in a vehicle such as an automobile, and comprises a butterfly valve bearing support device, which is provided on the resin intake manifold 2, and supports the rotor (butterfly valve assembly) 3 in a freely rotatable manner via first through fifth valve bearing members (11 through 15) described below. Here, the intake manifold 2 of the engine 1 of the present embodiment distributes and supplies the intake air entering the intake manifold 2 to the intake ports (not shown in the diagrams) provided in each cylinder of the engine 1. This intake manifold 2 is made of a resin in order to reduce weight and lower costs, and is molded as an integrated unit from a resin material (for example, a glass fiber-reinforced thermoplastic resin). From the viewpoints of thermal resistance and strength, the thermoplastic resin used in the intake manifold 2 is preferably a polyamide resin (PA), unsaturated polyester resin (UP), polyphenylene sulfide (PPS), or polybutylene terephthalate (PBT), or the like.

The intake air taken into each cylinder of the engine 1 flows into an air connector 21 of the intake manifold 2, having passed through an air cleaner (not shown in the diagrams) and a throttle body (not shown in the diagrams), and is distributed to a plurality of intake air passages via a surge tank 22. The intake manifold 2 which forms these intake air passages constitutes an intake manifold (branch pipe) that branches from the surge tank 22 on the output side of the air connector 21 in accordance with the number of cylinders of the engine 1. Moreover, in the present embodiment, the intake manifold 2 is composed of two intake manifolds (branch pipes), but may also be composed of one intake manifold (branch pipe). Furthermore, first to fourth intake air passages 23, which, of the plurality of intake air passages, are used when the engine is at a low or intermediate speed, are formed so as to have a passage length longer than first to fourth intake air passages 24, which are used when the engine is at a high speed. Furthermore, the first to fourth intake air passages 24 and the first to fourth intake air passages 23, which branch partway along the intake passage, rejoin at a position further downstream along the flow direction of the intake air, that is, at a position of a first to fourth intake air passages 25 on the cylinder side of the engine 1, which then connect through to the intake port of each cylinder of the engine 1. Here, a rotor bearing section 26, for supporting the rotor (the butterfly valve assembly) 3 in a freely rotatable manner via the first to fifth valve bearing members (11 to 15), is provided as an integrated part of the intake manifold 2. A bearing engagement hole 27 with a circular cross-sectional shape, into which the first to fifth valve bearing members (11 to 15) are engaged, is formed in this rotor bearing section 26.

The rotor 3 of the present embodiment comprises multiple integrated butterfly valves (hereafter referred to as the first to fourth butterfly valves) 4 which open and close the first to fourth intake air passages 24 formed in the intake manifold 2, thereby changing the cross-sectional area, and a single valve shaft 5 or the like which rotates in an integrated manner with the first to fourth butterfly valves 4. The first to fourth butterfly valves 4 are made completely from a resin, by integrated molding of a resin material (for example, a glass fiber-reinforced thermoplastic resin). In a similar manner to the intake manifold 2, the thermoplastic resin used in the first to fourth butterfly valves 4 is preferably a polyamide resin (PA), unsaturated polyester resin (UP), polyphenylene sulfide (PPS), or polybutylene terephthalate (PBT) or the like.

In addition, the first to fourth butterfly valves 4 are each held in a secured manner around the periphery of the single valve shaft 5, and rotate within a range of rotation from a fully opened position to a fully closed position about the rotation center axis of the valve shaft 5. The valve shaft 5 is a polygonal cross-section shaft formed from an iron-based metal material, wherein the cross section perpendicular to its rotational center axis is formed in the shape of a polygon such as a square. Furthermore, circular cylindrical valve axes (corresponding to the bearing contact section of the present invention) 31 and 32 cover the periphery of the valve shaft 5 and are molded from a resin in an integrated manner at both ends of the first to fourth butterfly valves 4 along the rotational center axis.

Furthermore, a shaft through-hole 33, through which the valve shaft 5 passes, is formed in each of the first to fourth butterfly valves 4. This shaft through-hole 33 is formed to have substantially the same cross-sectional shape as that of the valve shaft 5 and restricts relative rotation between the first to fourth butterfly valves 4 and the valve shaft 5. Here, if the valve shaft 5 with the polygonal cross-sectional shape is supported directly by the rotor bearing section 26 of the intake manifold 2, the valve shaft 5 cannot rotate smoothly. Consequently, the valve shaft 5 is covered by the valve axes 31 and 32 of the first to fourth butterfly valves 4, and the outside of the valve shaft 5 is supported in a freely rotatable manner by the rotor bearing section 26 of the intake manifold 2, via the valve axes 31 and 32.

Here, the variable intake system of the present embodiment also comprises a power unit 6, which acts as the actuator for rotationally driving the first to fourth butterfly valves 4 in the valve opening direction (or valve closing direction), a valve energizing device (not shown in the diagrams) such as a spring or the like for energizing the first to fourth butterfly valves 4 in the valve closing direction (or valve opening direction), and an engine control unit (hereafter referred to as an ECU: not shown in the diagrams), which controls the power unit 6 according to the operating state of the engine 1. The power unit 6 is housed within a resin actuator case 7 and comprises a drive motor 8 and a power transmission mechanism (a reduction gear mechanism) for transmitting the rotational power of the drive motor 8 to the first to fourth butterfly valves 4 via the valve shaft 5. The drive motor 8 is connected electrically to a microcomputer installed in the ECU and the ECU controls the opening and closing of the first to fourth butterfly valves 4 by interrupting the electrical current flowing to the drive motor 8. The torque from the motor output shaft of the drive motor 8 is transmitted to the valve shaft 5 via a valve-side gear 9.

The valve-side gear 9 forms one of the structural elements of the reduction gear mechanism for reducing the rotational speed of the drive motor 8 to a predetermined reduction ratio. The valve-side gear 9 is molded as an integrated unit from a resin material such as a thermoplastic resin. This valve-side gear 9 comprises a gear section 41, which engages with a motor side gear (pinion: not shown in the diagrams) attached to a motor shaft (an output shaft) of the drive motor 8, and a shaft engagement section 42, which is formed so as to protrude from this gear section 41 towards the left in the figure. A shaft insertion hole 43, into which the right hand end of the valve shaft 5 (the end on the power unit side) is inserted, is formed in this shaft engagement section 42. This shaft insertion hole 43 is formed substantially the same as the cross-sectional shape of the valve shaft 5 and restricts relative rotation of the valve-side gear 9 and the valve shaft 5.

Figure 4A:
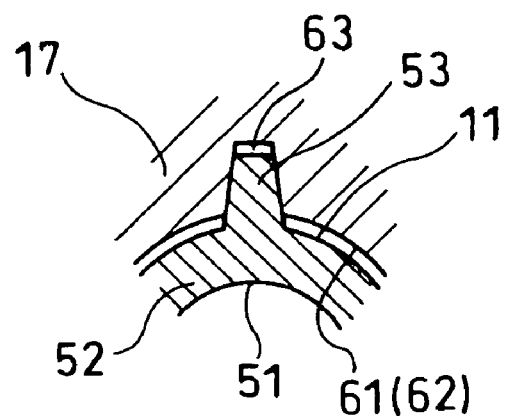
FIG. 4A is a partial cross-sectional end view of a first embodiment of an engagement section for tightly fitting a valve bearing member into a bearing holding member of the butterfly valve bearing support structure of FIG. 1.
Figure 4B:
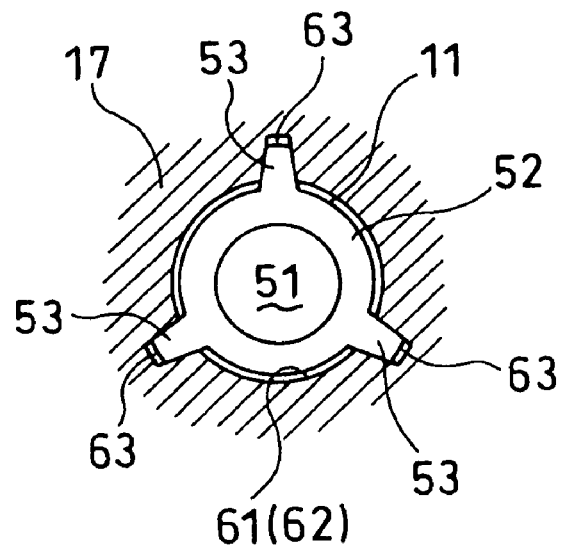
FIG. 4B is a cross-sectional end view of the valve bearing member fitted into the bearing holding member of the butterfly valve bearing support structure of FIG. 4A.
Figure 5A:
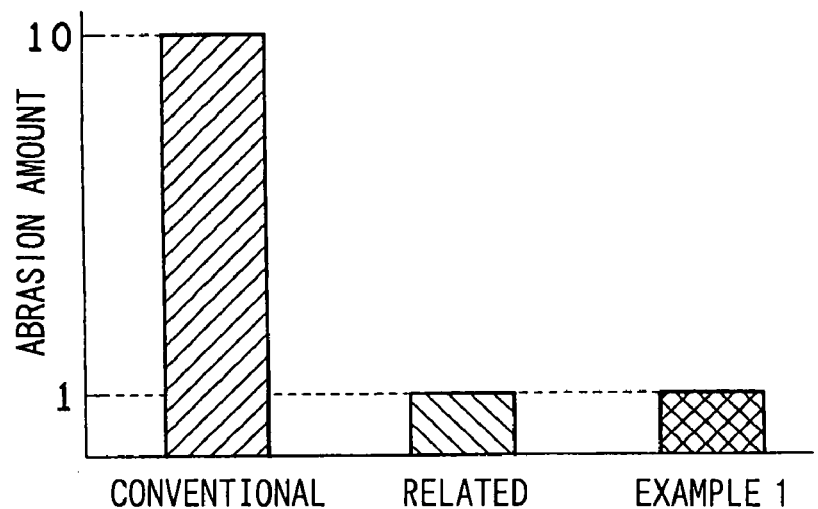
FIGS. 5A and 5B, respectively, are graphs illustrating an abrasion reduction effect and a cost reduction effect of the valve bearing member of FIG. 4 compared to a conventional art and a related art.
Figure 5B:
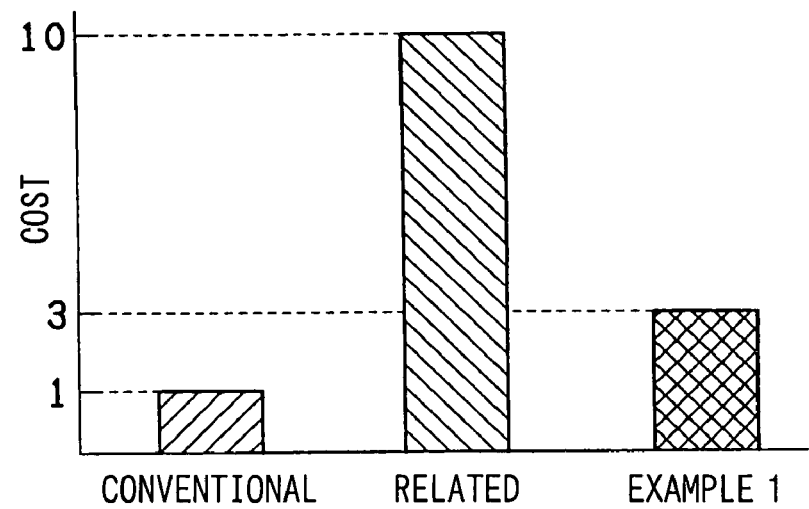

Next, a butterfly valve bearing support device used in the variable intake system of the present embodiment is described based on FIG. 1, FIG. 2, and FIG. 4. Here, FIGS. 4A and 4B show in detail the engagement section for tightly fitting the engagement protrusion of the first valve bearing member 11 within the engagement depression 63 of the fitting hole 61 of the bearing holding member 17.

The butterfly valve support device of the present embodiment comprises the first through fifth valve bearing members 11 to 15, which are formed from a resin material as integrated units, a gear bearing member 16 (shown in FIG. 2) formed from a metal material as an integrated unit, and a holding member 17 for securing and holding the first valve bearing member 11 via an engagement force produced by tightly fitting the first valve bearing member 11 therein. Of these, the second to fourth valve bearing members 12 through 14 have a valve bearing hole with a circular cross section, and are provided as separate bodies from the rotor bearing section 26 of the intake manifold 2. The second to fourth valve bearing members 12 through 14 may also be formed in an integrated manner with the intake manifold 2, that is, formed on the intake manifold 2 itself.

The second to fourth valve bearing members 12 through 14 are circular cylindrical intermediate bearing members (circular cylindrical bearing members), which axially support the center part of the rotor 3 in a freely rotatable manner and are engaged and held by fitting tightly within the inner circumference of the bearing engagement hole 27 of the rotor bearing section 26. Vibration at the center part of the rotor 3 caused by pulsation of the intake air is less than that produced at the opposite end of the rotor 3 from the power unit (the first intake air passage 24 end). Consequently, there is no need to precisely minimize the bearing clearance between the outer circumferential surface (outer diameter surface) of the valve axis 31 of the first butterfly valve 4, the valve axes 31 and 32 of the second and third butterfly valves 4 and the valve axis 32 of the fourth butterfly valve 4, and the inner circumferential surface (inner diameter surface) of the valve bearing holes of the second to fourth valve bearing members 12 to 14. Accordingly, the second to fourth valve bearing members 12 to 14 can be formed by integrated resin molding from a resin material with a lower molding precision than that offered by metal materials, which enables reduced weight and lower costs to be achieved.

Furthermore, the first valve bearing member 11 is a noncircular cylindrical first end bearing member (a noncircular cylindrical bearing member) that axially supports the rotor 3 in a freely rotatable manner at the end section on the side opposite to the power unit (the first intake air passage 24 side). The first valve bearing member 11 is engaged and held by being fitted tightly within the inner circumference of the bearing engagement hole 27 of the rotor bearing section 26 of the intake manifold 2 via the bearing holding member 17. In addition, the fifth valve bearing member 15 is a circular cylindrical second end bearing member (a circular cylindrical bearing member) that axially supports the rotor 3 in a freely rotatable manner at the end on the power unit side (the fourth intake air passage 24 side). The fifth valve bearing member 15 is engaged and held by being fitted tightly within the inner circumference of the bearing fitting hole 27 of the rotor bearing section 26 of the intake manifold 2. Moreover, the first to fifth valve bearing members 11 to 15 are made completely of a resin material that preferably has excellent slidability and abrasion resistance, for example, a thermoplastic resin comprising a polyamide resin (PA) or the like.

In addition, the gear bearing member 16 is a circular cylindrical metallic bearing fitted between the outer circumference of the shaft engagement section 42 of the valve-side gear 9 and the inner circumference of the rotor bearing section 26 of the intake manifold 2. The fifth valve bearing member 15 is provided as a separate body from the rotor bearing section 26 of the intake manifold 2, but may also be integrated with the intake manifold 2, that is, be part of the intake manifold 2 itself. Here, the second to fifth valve bearing members 12 to 15 and the gear bearing member 16 have valve bearing holes passing therethrough along the rotational center axis of the rotor 3. A coating of a material with low sliding resistance such as a fluororesin coating including a polytetrafluoroethylene resin (PTFE) or a lubricant such as molybdenum disulfide) may be applied between the outer diameter surface (outer circumferential surface) of the valve axes 31 and 32 of the first to fourth butterfly valves 4 of the rotor 3 and the inner diameter surface (inner circumferential surface) of the valve bearing holes 51 of the first to fifth valve bearing members 11 to 15. Such coating could reduce the sliding resistance during relative movement between the valve axes 31 and 32 of the first to fourth butterfly valves 4 of the rotor 3 and the first to fifth valve bearing members 11 to 15.

Of these, the first valve bearing member 11 provided at the end of the rotor 3 on the opposite side to the power unit (the first intake air passage 24 side) has a valve bearing hole 51 that passes through the member along the rotational center axis of the rotor 3. Furthermore, the first valve bearing member 11 comprises a circular cylindrical valve bearing section (a circular cylindrical section) 52 and a plurality of engagement protrusions (protruding sections, projections) 53. The engagement protrusions 53 protrude radially outward from the outer circumferential surface (outer diameter surface) of this valve bearing section 52. The valve bearing section 52 has a substantially circular cross section. The valve bearing hole 51 described above is formed inside this valve bearing section 52. The valve bearing hole 51 is formed with a hole shape that is substantially the same as the cross-sectional shape of the valve axis 31 of the first butterfly valve 4, thereby enabling smooth rotation of the first to fourth butterfly valves 4 and the first valve bearing member 11.

Furthermore, the butterfly valve bearing support device of the present embodiment also comprises the bearing holding member 17 that holds the first valve bearing member 11 inside a fitting hole 61 that passes through the bearing holding member along the rotational center axis of the rotor 3. This bearing holding member 17 is provided as a separate body from the rotor bearing section 26 of the intake manifold 2, but may also be integrated with the intake manifold 2, that is, be formed as a part of the intake manifold 2 itself. Furthermore, the valve bearing section 52 of the first valve bearing member 11 is clearance fitted into the fitting hole 61 of the bearing holding member 17. In addition, the plurality of engagement protrusions 53 are secured by an engagement force produced by tightly fitting (press fitting) the protrusions into the fitting hole 61 of the bearing holding member 17. Three or more of these engagement protrusions 53 are provided at predetermined intervals (for example 120° intervals) around the circumferential direction of the valve bearing section 52 so as to protrude radially outward from the outer diameter surface of the valve bearing section 52. Furthermore, the plurality of engagement protrusions 53 taper with increasing distance from the outer surface of the valve bearing section 52 (in a radially outward direction of the valve bearing section 52), or in other words, are formed as having a substantially truncated triangular cross-sections (tapered shape) where the thickness in the circumferential direction reduces.

Furthermore, within the fitting hole 61 of the bearing holding member 17 is formed a substantially circular engagement hole section (circular hole section) 62 for clearance fitting the outer circumference of the valve bearing section 52 of the first valve bearing member 11. Additionally, the fitting hole 61 includes a plurality of engagement depressions 63, which are provided at positions that extend radially outward beyond the inner diameter surface of the engagement hole section 62. The engagement hole section 62 has a substantially circular shaped hole that corresponds with the cross-sectional shape of the valve bearing section 52 of the first valve bearing member 11. Furthermore, the plurality of engagement depressions 63 hold the plurality of engagement protrusions 53 of the first valve bearing member 11 in a secure manner by tight fitting (press fitting), which relies on surface contact or line contact or the like. Three or more of these engagement depressions 63 are provided at positions that extend radially outward beyond the inner diameter surface of the engagement hole section 62 at predetermined intervals (for example 120° intervals) around the circumferential direction of the engagement hole section 62. Furthermore, the plurality of engagement depressions 63 are formed with internal surfaces that are substantially the same as the external shape of the plurality of engagement protrusions 53. Furthermore, the plurality of engagement depressions 63 taper with increasing depth (radially outward from the engagement hole section 62) from openings positioned around a circular circumference that lies concentrically with the inner diameter surface of the engagement hole section 62 or in other words, are formed as having a substantially truncated triangular cross-section (tapered shape) where the thickness in the circumferential direction reduces.

Here, the engagement section for holding and securing (securing by engagement, securing by press fitting) the plurality of engagement protrusions 53 of the first valve bearing member 11, via an engagement force produced by tightly fitting the protrusions into the plurality of engagement depressions 63 of the fitting hole 61 of the bearing holding member 17 of the present embodiment, is provided in a positional relationship relative to the valve bearing hole 51 formed inside the valve bearing section 52 of the first valve bearing member 11 that enables the above engagement force produced by the tight fitting to act in a direction that does not affect the inner diameter dimensions of the valve bearing hole 51. Furthermore, the engagement section is provided in a positional relationship relative to the valve bearing hole 51 formed in the valve bearing section 52 of the first valve bearing member 11 that enables an orientation of the engagement stress, which is generated in the plurality of engagement protrusions 53 when this plurality of engagement protrusions 53 are fitted tightly into the plurality of engagement depressions 63, to occur in substantially the circumferential direction of the valve bearing section 52 of the first valve bearing member 11 away from the radial inner diameter of the valve bearing section 52.

Specifically, the engagement section between the plurality of engagement protrusions 53 and the plurality of engagement depressions 63 is provided so as to be positioned radially outward from the outer diameter surface of the valve bearing section 52 of the first valve bearing member 11 so that the orientation of the engagement stress, which is generated in the plurality of engagement protrusions 53 when this plurality of engagement protrusions 53 is fitted tightly into the plurality of engagement depressions 63, does not pass through the valve bearing section 52 of the first valve bearing member 11. In other words, the engagement force caused by the tight fitting acts in a direction which does not affect the inner diameter dimensions of the valve bearing hole 51. Moreover, in the present embodiment, the plurality of engagement protrusions 53 and the plurality of engagement depressions 63 are formed as having tapered triangular cross-sections that taper in a radially outward direction of the valve bearing section 52 of the first valve bearing member 11. In other words, both side wall surfaces in the circumferential direction of the plurality of engagement protrusions 53 and both inner wall surfaces in the circumferential direction of the plurality of engagement depressions 63 are inclined at a predetermined angle from a reference line orthogonal to the center axis of the valve bearing hole 51 and the fitting hole 61. Consequently, by setting this angle so that a vertical line that is orthogonal to the side wall surfaces in the circumferential direction of the plurality of engagement protrusions 53, and the inner wall surfaces in the circumferential direction of the plurality of engagement depressions 63 is substantially parallel to the tangential line of the valve bearing section 52 of the first valve bearing member 11, the engagement section between the plurality of engagement protrusions 53 and the plurality of engagement depressions 63 can be set to the positional relationship described above.

Next, a method of assembling the first valve bearing member 11 in the fitting hole 61 of the bearing holding member 17 of the present embodiment is described based on FIG. 1, FIG. 2, and FIG. 4.

The first valve bearing member 11 of the present embodiment is inserted into the fitting hole 61 of the bearing holding member 17 along the rotational center axis of the rotor (the butterfly valve assembly) 3, which is constructed from the first through fourth butterfly valves 4 and the valve shaft 5 and the like. At this time, the valve bearing section 52 of the first valve bearing member 11 is clearance fitted into the engagement hole section 62 of the bearing holding member 17. The plurality of engagement protrusions 53 of the first valve bearing member 11 are fitted tightly (press fitted) into the plurality of engagement depressions 63 of the bearing holding member 17. As a result, the first valve bearing member 11 is held and secured inside the fitting hole 61 of the bearing holding member 17 without affecting the inner diameter dimensions of the valve bearing hole 51 of the valve bearing section 52. Simultaneously, the center axis of the valve bearing hole 51 of the valve bearing section 52 of the first valve bearing member 11 is centered. In other words, the center axis of the valve bearing hole 51 of the valve bearing section 52 of the first valve bearing member 11 is positioned along the center axis of the fitting hole 61 of the bearing holding member 17, which coincides with the rotational center axis of the butterfly valve assembly comprising the first to fourth butterfly valves 4 and the valve shaft 5.

Here, it does not matter whether the bearing holding member 17 engages and holds the first valve bearing member 11 before being secured to the rotor bearing section 26 of the intake manifold 2 using heat welding or screws or the like. Furthermore, it does not matter whether the bearing holding member 17 is secured to the rotor bearing section 26 of the intake manifold 2 using heat welding or screws or the like before engaging and holding the first valve bearing member 11. Further yet, it does not matter whether the valve axis 31 of the first to fourth butterfly valves 4 is inserted in the valve bearing hole 51 of the valve bearing section 52 of the first valve bearing member 11 before the first valve bearing member 11 is engaged and held by the bearing holding member 17 or whether the first valve bearing member 11 is engaged and held by the bearing holding member 17 before the valve axis 31 of the first to fourth butterfly valves 4 is inserted in the valve bearing hole 51 of the valve bearing section 52 of the first valve bearing member 11.

Still further, it does not matter whether the valve shaft 5 is first inserted into each shaft through-hole 33 of the first through fourth butterfly valves 4, the valve axes 31 and 32 of the first to fourth butterfly valves 4 are then inserted into the valve bearing hole 51 of the first to fifth valve bearing members 11 to 15 and the butterfly valve assembly is then assembled with the butterfly valve bearing support device, specifically the rotor bearing section 26 of the intake manifold 2, or whether the valve axes 31 and 32 of the first to fourth butterfly valves 4 are first inserted into the valve bearing holes 51 of the first to fifth valve bearing members 11 to 15, the valve shaft 5 is then inserted into each shaft through-hole 33 of the first to fourth butterfly valves 4, and the butterfly valve assembly is then assembled with the butterfly valve bearing support device, specifically the rotor bearing section 26 of the intake manifold 2.

Next, the operation of the variable intake system of the present embodiment is described based on FIG. 1 through FIG. 3.

According to the variable intake system of the present embodiment, when the engine speed is in a low to intermediate revolution range, the valve shaft 5 is rotationally driven in the normal rotation direction (the valve closing direction) by the power unit 6. When the valve shaft 5 is driven in the normal rotational direction, the valve axes 31 and 32 of the first to fourth butterfly valves 4 rotate in the normal rotational direction (the valve closing direction) by sliding within the first to fifth valve bearing members 11 to 15 and the inner circumference of the valve bearing hole 51 of the gear bearing member 16, thereby closing the first to fourth intake air passages 24. Accordingly, the intake air that enters the air connector 21 of the intake manifold 2 via the air cleaner and the throttle body is distributed via the surge tank 22 only to the first to fourth intake air passages 23 with the long intake pipe length (passage length), and is subsequently introduced into the combustion chamber of each cylinder of the engine 1 via the first to fourth intake air passages 25 and the intake port of each cylinder.

Furthermore, when the engine speed is in a high revolution range, the valve shaft 5 is rotationally driven in a reverse rotational direction (the valve opening direction) by the power unit 6. When the valve shaft 5 is driven in the reverse rotational direction, the valve axes 31 and 32 of the first to fourth butterfly valves 4 rotate in the reverse rotational direction (the valve opening direction) by sliding within the first to fifth valve bearing members 11 to 15 and the inner circumference of the valve bearing hole 51 of the gear bearing member 16, thereby opening the first to fourth intake air passages 24. Accordingly, the intake air that enters the air connector 21 of the intake manifold 2 via the air cleaner and the throttle body travels via the surge tank 22 using both the first to fourth intake air passages 24 and the first to fourth intake air passages 23 returns to a single stream at the first to fourth intake air passages 25 and is then introduced into the combustion chamber of each cylinder of the engine 1 via the intake port of each cylinder. Accordingly, the effective air intake pipe length (passage length) is switched to a length that enables inertia supercharging in accordance with the engine speed, thereby improving the charging efficiency.

As described above, in the butterfly valve bearing support device used in the variable intake system of the present embodiment, the first to fourth butterfly valves 4 of the rotor 3, the first valve bearing member 11 and the bearing holding member 17 are all made of a resin, thus providing a bearing structure in which each component is made of a resin material with a comparatively low molding precision. Furthermore, the engagement section for tightly fitting the plurality of engagement protrusions 53 of the first valve bearing member 11 into the plurality of engagement depressions 63 of the fitting hole 61 of the bearing holding member 17 is provided in a positional relationship relative to the valve bearing hole 51 that enables the engagement force produced by the tight fitting to act in a direction that does not affect the inner diameter dimensions of the valve bearing hole 51 of the first valve bearing member 11.

Furthermore, the engagement section for tightly fitting the plurality of engagement protrusions 53 of the first valve bearing member 11 into the plurality of engagement depressions 63 of the fitting hole 61 of the bearing holding member 17 is provided in a positional relationship relative to the valve bearing hole 51 that enables the orientation of the engagement stress, which is generated in the plurality of engagement protrusions 53 of the first valve bearing member 11 when the plurality of engagement protrusions 53 of the first valve bearing member 11 are fitted tightly into the plurality of engagement depressions 63 of the fitting hole 61 of the bearing holding member 17, to occur in substantially the circumferential direction of the valve bearing section 52 of the first valve bearing member 11, away from the radial inner diameter side of the valve bearing section 52 of the first valve bearing member 11.

As a result, even when the plurality of engagement protrusions 53 of the first valve bearing member 11 are fitted tightly into the plurality of engagement depressions 63 of the fitting hole 61 of the bearing holding member 17, thereby holding and securing the first valve bearing member 11 within the fitting hole 61 of the bearing holding member 17, because the engagement force caused by the tight fitting acts in a direction that does not affect the inner diameter dimensions of the valve bearing hole 51 of the first valve bearing member 11, the bearing clearance between the inner diameter surface of the valve bearing hole 51 of the first valve bearing member 11 and the outer diameter surface of the valve axis 31 of the first butterfly valve 4 of the rotor 3 can be substantially minimized, while preventing deterioration in the circularity of the valve bearing hole 51 and the concentricity of the bearing section. Furthermore, because the first valve bearing member 11 can be engaged and held securely within the fitting hole 61 of the bearing holding member 17 via the engagement force generated by simply fitting the first valve bearing member 11 into the fitting hole 61 of the bearing holding member 17, the assembly process is simple, and fewer parts are needed, enabling improved productivity and lower costs to be realized.

Accordingly, the engagement section for tightly fitting the plurality of engagement protrusions 53 of the first valve bearing member 11 into the plurality of engagement depressions 63 of the fitting hole 61 of the bearing holding member 17 does not affect the inner diameter dimensions of the valve bearing hole 51 of the first valve bearing member 11, and when the plurality of engagement protrusions 53 of the first valve bearing member 11 are fitted tightly into the plurality of engagement depressions 63 of the fitting hole 61 of the bearing holding member 17, the center axis of the valve bearing hole 51 formed in the valve bearing section 52 of the first valve bearing member 11 can be substantially aligned with the rotation center axis of the valve axis 31 of the first butterfly valve 4 of the rotor 3. In other words, centering of the fitting hole 61 of the first valve bearing member 11 and the valve bearing section 52 can be achieved at the same time that the plurality of engagement protrusions 53 of the first valve bearing member 11 are fitted into the plurality of engagement depressions 63 of the fitting hole 61 of the bearing holding member 17.

As a result, even with a bearing structure in which the components are made of a resin material with a comparatively low molding precision, by simply fitting the first valve bearing member 11 into the fitting hole 61 of the bearing holding member 17, it is possible to favorably maintain the circularity and concentricity of the valve bearing hole 51 of the first valve bearing member 11, which allows both favorable slidability between the valve axis 31 of the first butterfly valve 4 of the rotor 3 and the valve bearing hole 51 of the first valve bearing member 11, and good reliability to be achieved. In other words, in the butterfly valve bearing support structure according to the first embodiment, the amount of abrasion in the bearing sliding section between the outer periphery of the valve axis 31 of the first butterfly valve 4 of the rotor 3 and the inner periphery of the valve bearing hole 51 of the first valve bearing member 11 can be reduced dramatically in comparison with the butterfly valve bearing support structure according to the conventional embodiment described above and shown in the graph in FIG. 5A. Moreover, as shown in the graph in FIG. 5B, costs can be reduced dramatically in comparison with the butterfly valve bearing support structure according to the related embodiment because of the improvement in productivity that results from the simpler assembly process and the reduced number of components.

Furthermore, the material used to mold the first through fifth valve bearing members 11 to 15 as integrated resin units can be a composite material resin system (an abrasion resistant resin material) produced by mixing or adding a material with low sliding resistance (for example, a fluororesin powder such as a polytetrafluoroethylene resin (PTFE)), which is capable of reducing the sliding resistance during relative movement between the valve axes 31 and 32 of the first to fourth butterfly valves 4 of the rotor 3 and the first to fifth valve bearing members 11 to 15, to a resin material (for example, a molten resin comprising a thermoplastic resin such as a polyamide resin (PA)) that has been converted to a molten state by heating. Moreover, the first to fifth valve bearing members 11 to 15, which are formed from a resin, may be produced by injection molding of this abrasion resistant resin material. In this case, the slidability between the valve axes 31 and 32 of the first to fourth butterfly valves 4 of the rotor 3 and the valve bearing hole 51 of the first to fifth valve bearing members 11 to 15 can be further improved, and the abrasion resistance of the valve axes 31 and 32 of the first to fourth butterfly valves 4 and of the first to fifth valve bearing members 11 to 15 can be further improved. Furthermore, by only applying the comparatively expensive abrasion resistant resin material to the first to fifth valve bearing members 11 to 15 of the rotor bearing sections 26 of the intake manifold 2, any increase in the cost of the butterfly valve bearing support device used in the variable intake system can be suppressed.

Figure 6:
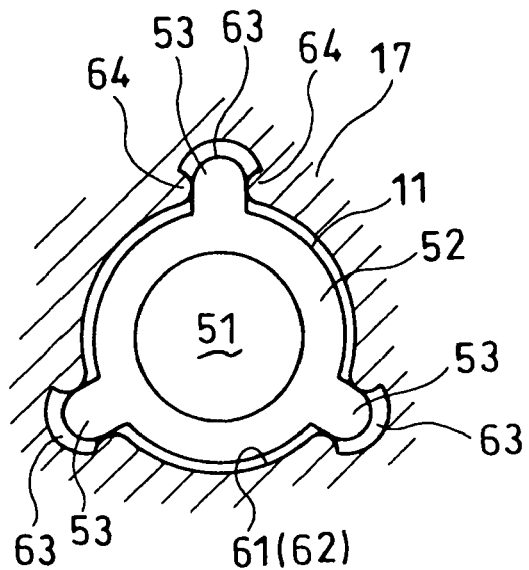
FIG. 6 is a cross-sectional end view of a second embodiment of a valve bearing member fitted into a bearing holding member of the butterfly valve bearing support structure of FIG. 1.

FIG. 6 shows a second embodiment of the present invention including the engagement section for tightly fitting the engagement protrusions 53 of the first valve bearing member 11 into the engagement depressions 63 of the fitting hole 61 of the bearing holding member 17.

As shown in FIG. 6, in the butterfly valve bearing support structure used in the variable intake system of this embodiment, the plurality of engagement protrusions 53, which are formed so as to protrude radially outward from the outer diameter surface of the valve bearing section 52 of the first valve bearing member 11, each comprise a hemispherical surface and a circular cylindrical shape. Furthermore, two hemispherical protrusions 64, which hold the cylindrical shaped section of one of the plurality of engagement protrusions 53 in a secure manner via point contact or line contact, are provided on the inner wall surface of each of the plurality of engagement depressions 63, which are formed so as to protrude radially outward from the inner diameter surface of the engagement hole section 62 of the fitting hole 61 of the bearing holding member 17. Even in this case, the engagement section for tightly fitting the plurality of engagement protrusions 53 of the first valve bearing member 11 between the protrusions 64 of the fitting hole 61 of the bearing holding member 17 can be provided in a positional relationship relative to the valve bearing hole 51 formed in the valve bearing section 52 of the first valve bearing member 11 that enables the engagement force generated by the tight fitting to act in a direction that does not affect the inner diameter dimensions of the valve bearing hole 51. As a result, it is possible to realize the same effects as the butterfly valve bearing support structure of the first embodiment.

Figure 7:
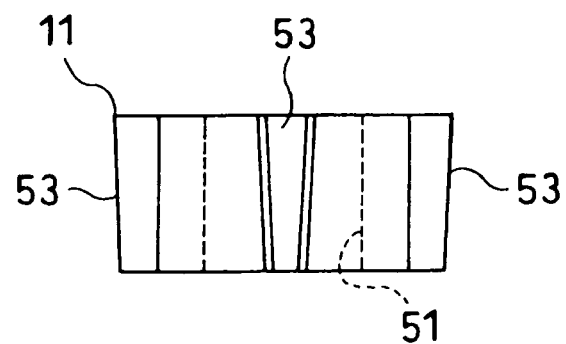
FIG. 7 is a hidden side view of a third embodiment of a valve bearing member.
Figure 8:
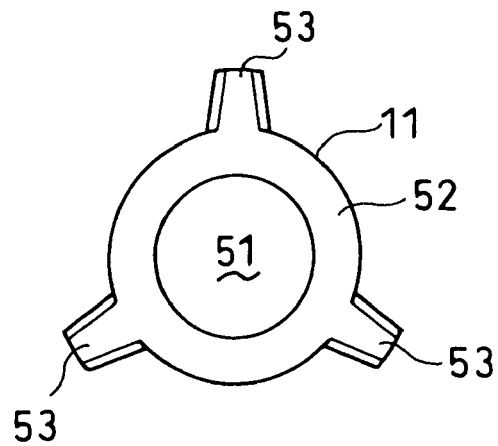
FIG. 8 is an end view of the valve bearing member of FIG. 7.
Figure 9:
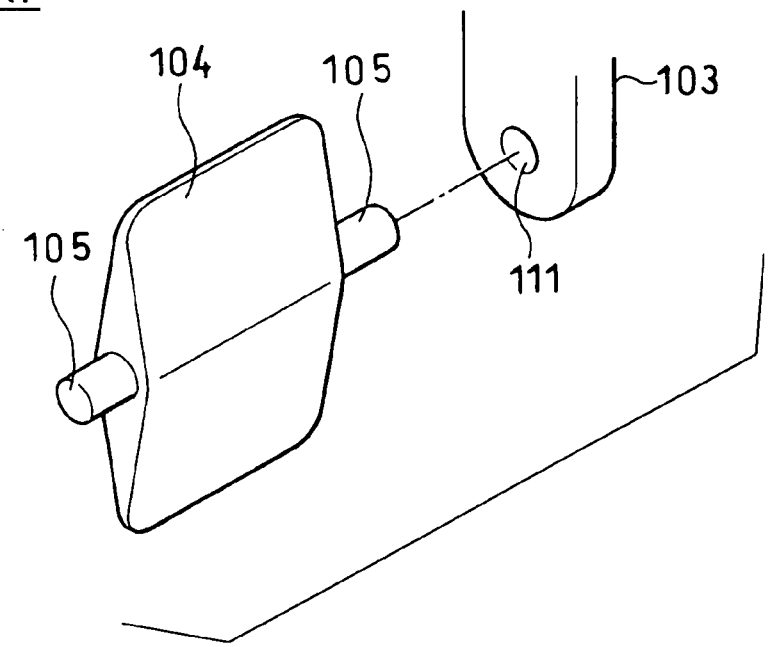
FIG. 9 is an exploded view of a conventional butterfly valve bearing support structure.
Figure 10:
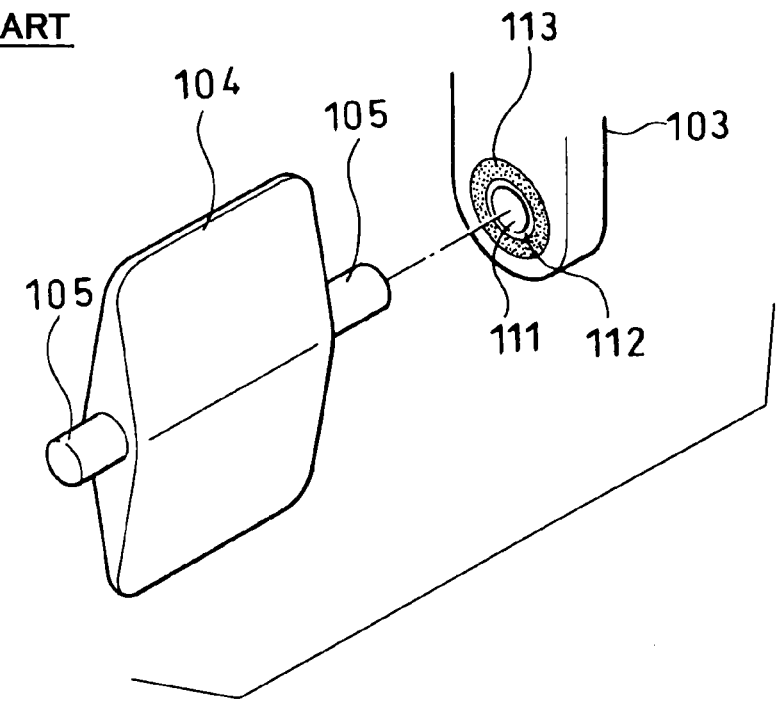
FIG. 10 is an exploded view of a related butterfly valve bearing support structure.
Figure 11:
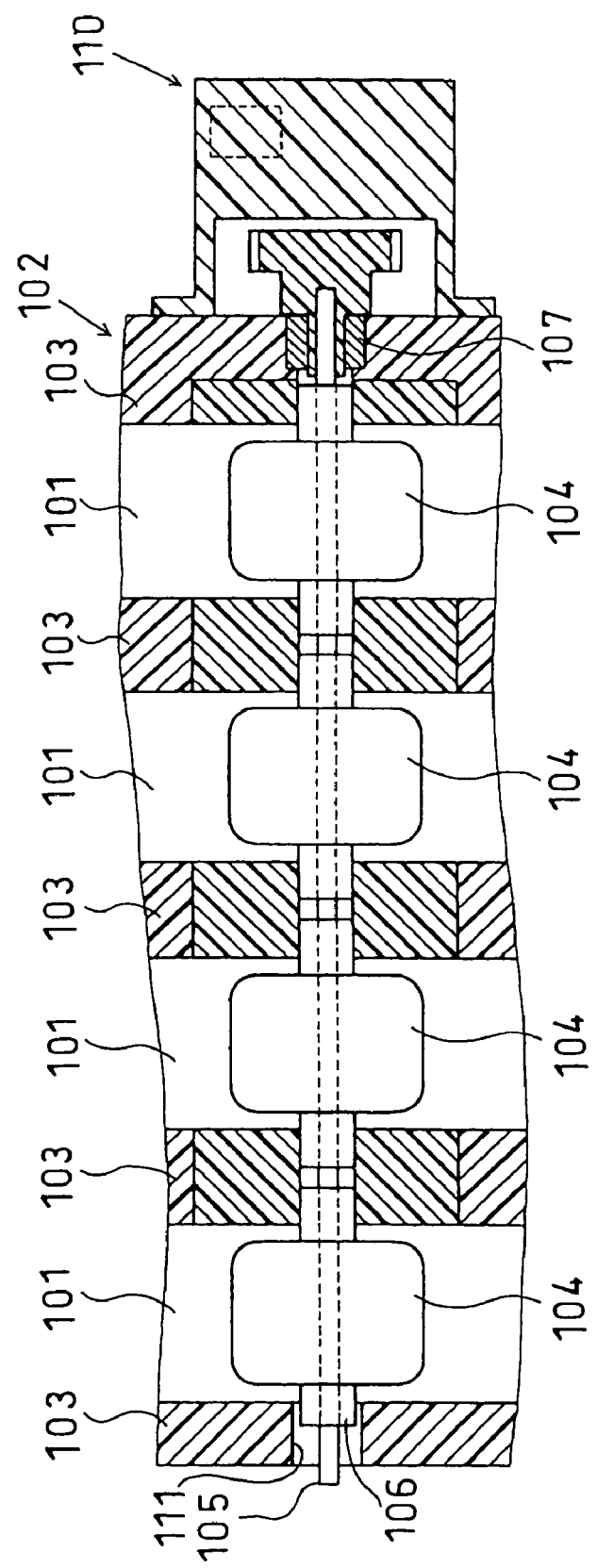
FIG. 11 is a cross-sectional view of a variable intake system including the conventional butterfly valve bearing support structure of FIG. 9.
Figure 12:
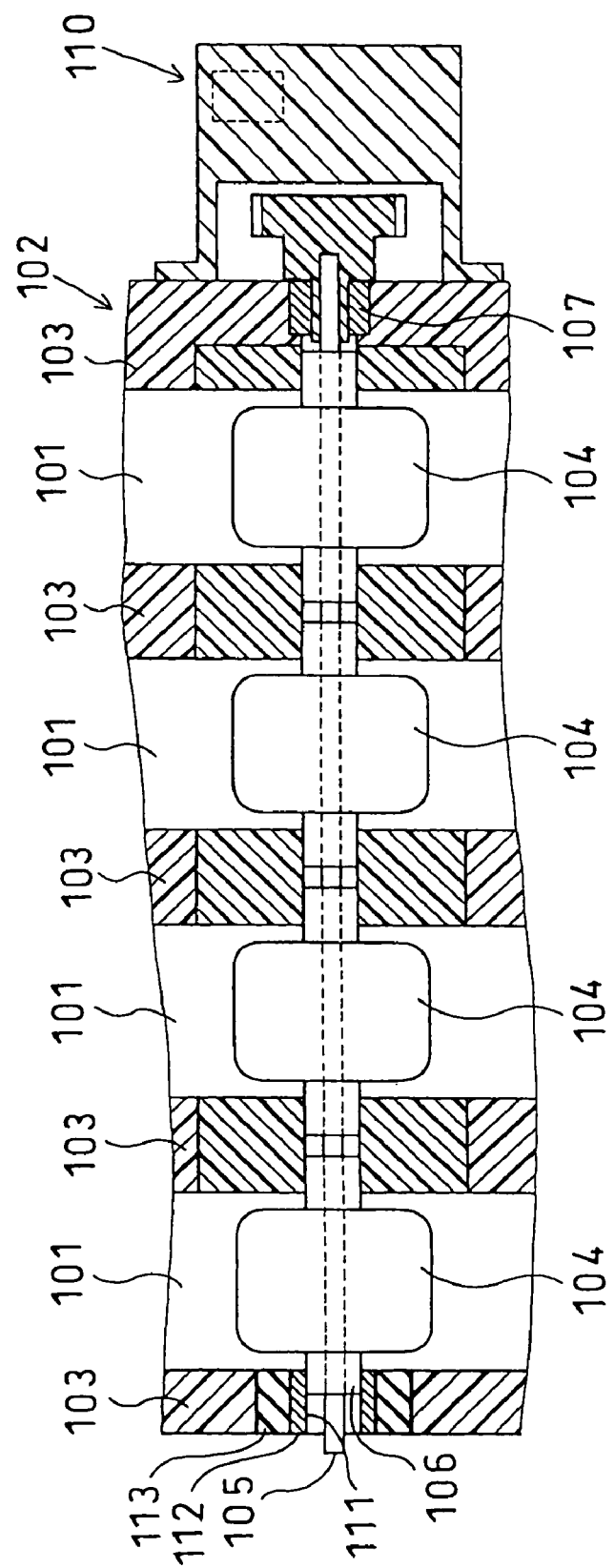
FIG. 12 is a cross-sectional view of a variable intake system including the related butterfly valve bearing support system of FIG. 10.

FIGS. 7 and 8 show a butterfly valve bearing support structure used in the variable intake system of a third embodiment including the plurality of engagement protrusions 53 formed so as to protrude radially outward from the outer diameter surface of the valve bearing section 52 of the first valve bearing member 11 are each formed in an approximately truncated triangular shape (a tapered shape) that tapers towards the direction of insertion of the first valve bearing member 11 into the fitting hole 61 of the bearing holding member 17. Furthermore, the plurality of engagement depressions 63, which are formed so as to protrude radially outward from the inner diameter surface of the engagement hole section 62 of the fitting hole 61 of the bearing holding member 17, are formed in an approximately truncated triangular shape (tapered shape) that taper from an opening positioned at one end face of the bearing holding member 17 (the left end face in FIG. 1) towards an opening positioned at the opposite end face of the bearing holding member 17 (the right end face in FIG. 1). In this case, the further the plurality of engagement protrusions 53 of the first valve bearing member 11 are fitted into the plurality of engagement depressions 63 of the fitting hole 61 of the bearing holding member 17, the more firmly the plurality of engagement protrusions 53 of the first valve bearing member 11 are held in a secured manner within the plurality of engagement depressions 63 of the fitting hole 61 of the bearing holding member 17, without affecting the inner diameter dimensions of the valve bearing hole 51 formed inside the valve bearing section 52 of the first valve bearing member 11.

Furthermore, an abrasion resistant resin material produced by mixing or adding a filler material (for example, a fluororesin powder such as a polytetrafluoroethylene resin (PTFE)) or an additive material for reducing the sliding resistance during relative movement between the first to fourth butterfly valves 4 and the first valve bearing member 11 may be used for molding solely the circumferential edge section of the valve bearing hole 51 of the valve bearing section 52 of the first valve bearing member (the noncircular cylindrical bearing member) 11 provided at the end of the rotor 3 on the opposite side to the power unit (the first intake air passage 24 side).

Furthermore, a coating of a material with low sliding resistance (for example, a fluororesin coating such as a polytetrafluoroethylene resin (PTFE) or a lubricant such as molybdenum disulfide) for reducing the sliding resistance during relative movement between the first to fourth butterfly valves 4 and the first valve bearing member 11 may be applied solely to the inside circumference of the valve bearing hole 51 of the valve bearing section 52 of the first valve bearing member (the noncircular cylindrical bearing member) 11. Furthermore, it is also possible to apply a coating of the material with low sliding resistance (for example, a fluororesin coating such as a polytetrafluoroethylene resin (PTFE) or a lubricant such as molybdenum disulfide) for reducing the sliding resistance during relative movement between the first to fourth butterfly valves 4 and the first to fifth valve bearing members 11 to 15 to the outside circumference of the valve axes 31 and 32 of the first to fourth butterfly valves 4.

In the above embodiments, the rotor bearing support structure was applied to a butterfly valve bearing structure for supporting the first to fourth butterfly valves 4 used in a variable intake system in a freely rotatable manner using the rotor bearing section 26 of the resin intake manifold 2, but the rotor bearing support structure may also be applied to a butterfly valve bearing support structure for supporting a butterfly valve used as an intake air volume control valve such as an idle speed control valve (ISCV) or a throttle valve, wherein the butterfly valve is supported in a freely rotatable manner using a valve bearing section of the resin engine intake pipes or resin throttle body.

Furthermore, the rotor bearing support structure may also be applied to a butterfly valve bearing support structure for supporting a butterfly valve that is used as an intake air flow control valve such as a swirl control valve for inducing lateral vortex flow in the air flowing from the intake ports of the engine 1 into the combustion chambers of the cylinders of the engine 1, that is, a so-called swirl flow control valve or the like, wherein the butterfly valve is supported in a freely rotatable manner by a valve bearing section of the resin intake manifold or the resin intake pipes. Furthermore, the rotor bearing support structure may also be applied to a butterfly valve bearing support structure for supporting a butterfly valve that is used as an intake air flow control valve such as a tumble control valve for inducing longitudinal vortex flow in the air flowing from the intake ports of the engine 1 into the combustion chambers of the cylinders of the engine 1, that is, a so-called tumble flow control valve, wherein the butterfly valve is supported in a freely rotatable manner by a valve bearing section of the resin intake manifold or the resin intake pipes.

In the above embodiments, the plurality of engagement depressions 63 of the fitting hole 61 of the bearing holding member 17 are through-holes which pass through the bearing holding member in the direction of the rotation center axis of the valve axis 31 and the valve shaft 5 of the first butterfly valve 4 of the rotor 3, but it is also possible to provide, within the plurality of engagement depressions 63 of the fitting hole 61 of the bearing holding member 17 an engagement wall, which blocks the far side of each depression in the direction of insertion of the first valve bearing member 11 so that the plurality of engagement protrusions 53 of the first valve bearing member 11 engage with these engagement walls. Furthermore, the valve bearing section 52 of the first valve bearing member 11 or the engagement hole section 62 of the bearing holding member 17 may be formed in a polygonal cylindrical shape or a polygonal hole shape, respectively. Furthermore, the valve bearing section 52 may be formed in a polygonal cylindrical shape (a noncircular cylindrical shape) and the engagement hole section 62 formed in a circular shape or alternatively, the valve bearing section 52 may be formed in a circular cylindrical shape and the engagement hole section 62 formed in a polygonal shape (a noncircular shape).

In the above embodiments, the bearing support structure of the present invention is applied only to the first end bearing member, but the bearing support structure of the present invention may also be applied to the second end bearing member or an intermediately positioned bearing member. In this case, a bearing holding member is provided which holds either the second end bearing member or an intermediately positioned bearing member in a secure manner via an engagement force produced by tightly fitting the second end bearing member or the intermediately positioned bearing member into the fitting hole that passes through the bearing holding member in the direction of the rotation center axis of the rotor. Furthermore, the engagement section for tightly fitting the second end bearing member or the intermediately positioned bearing member into the fitting hole is provided in a positional relationship relative to the rotor bearing hole of the second end bearing member or the intermediately positioned bearing member that enables the engagement force produced by the tight fitting to act in a direction that does not affect the inner diameter dimensions of the rotor bearing hole. Furthermore, a rotational shaft such as a valve shaft or a motor shaft may also be used as the rotor, which is supported in a freely rotatable manner by the bearing holding member via the bearing member.

What is claimed is:

1. A bearing support device comprising
   a rotor that rotates about a rotational center axis,
   a bearing member for supporting said rotor in a freely rotatable manner within a bearing hole that passes through said bearing member along said rotational center axis of said rotor, and
   a bearing holding member for holding said bearing member via an engagement force produced by tightly fitting said bearing member within a fitting hole that passes through said bearing holding member along said rotational center axis of said rotor, wherein
   said bearing member and said bearing holding member define an engagement section including said bearing member tightly fitting into said fitting hole, said engagement section having a positional relationship relative to said bearing hole that enables the engagement force to act in a direction that does not affect an inner diameter dimension of said bearing hole, and
   said rotor and said bearing member are made of a resin.

2. The bearing support device according to claim 1, wherein
   said engagement section is provided in a positional relationship relative to said bearing hole such as to produce an engagement stress, which is generated within said bearing member when said bearing member is tightly fit into said fitting hole, occuring in a substantially circumferential direction away from a radial inner diameter of said bearing member.

3. The bearing support device according to claim 1, wherein
   said rotor has a bearing contact section for contacting an inner diameter surface of said bearing hole at one end along the rotational center axis direction of said rotor.

4. The bearing support device according to claim 1, wherein
   a low sliding resistance material for reducing sliding resistance during relative movement of said rotor and said bearing member is used between an outer diameter surface of said rotor and an inner diameter surface of said bearing hole.

5. The bearing support device according to claim 1, wherein
   said rotor has multiple integrated butterfly valves for altering either a passage length or a cross-sectional area of each intake air passage connected to a cylinder of a multiple cylinder engine.

6. The bearing support device according to claim 1, wherein
   said rotor has a butterfly valve for altering an intake air volume taken into a cylinder of an engine.

7. The bearing support device according to claim 1, wherein
   said rotor has a butterfly valve for generating a swirl flow or a tumble flow within intake air taken into a combustion chamber from an intake port of an engine.

8. The bearing support device according to claim 1, wherein
   said bearing member is formed as an integrated unit by injection molding of a composite material resin system produced by mixing or adding a low sliding resistance material, which is capable of reducing sliding resistance during relative movement between said rotor and said bearing member, to a resin material that has been converted to a molten state by heating.

9. The bearing support device according to claim 8, wherein
   said low sliding resistance material is provided only within a periphery of an inner diameter surface of said bearing hole.

10. The bearing support device according to claim 1, wherein
    said bearing holding member is formed as an integrated unit from a thermoplastic resin, and
    said bearing member is formed as an integrated unit from an identical resin material to said bearing holding member.

11. The bearing support device according to claim 10, wherein
    said bearing holding member is provided as an integrated part of any one of a resin intake manifold, a resin throttle body, a resin engine intake pipe and a resin housing.

12. The bearing support device according to claim 1, wherein
    said bearing member has a bearing section inside which said bearing hole is formed and an engagement protrusion formed so as to protrude outward from an outside wall surface of said bearing section,
    said fitting hole defines an engagement hole section for clearance fitting of said bearing section and an engagement depression for tightly fitting said engagement protrusion, and
    said engagement section includes said engagement protrusion tightly fit into said engagement depression.

13. The bearing support device according to claim 12, wherein
    said engagement section provides said engagement protrusion and said engagement depression to contact via any one of a surface contact, a line contact, and a point contact.

14. The bearing support device according to claim 12, wherein
    said engagement protrusion is formed in a tapered shape that tapers in a direction of insertion of said bearing member into said bearing holding member, and
    said engagement depression is formed in a tapered shape that tapers away from an opening positioned on one end face of said bearing holding member towards an opening positioned on an opposite end face of said bearing holding member.

15. The bearing support device according to claim 12, wherein
   said bearing section has a substantially circular cylindrical cross section,
   said engagement hole section has a substantially circular hole shape which corresponds with the cross-sectional shape of said bearing section, and
   said engagement depression having opposing hemispherical protrusions extending the longitudinal length thereof for engaging the engagement protrusion such that the engagement protrusion is tightly held on the circumferential surfaces of the opposing hemispherical protrusions.

16. The bearing support device according to claim 12, wherein
   said bearing section has a substantially circular cylindrical cross section,
   said engagement hole section has a substantially circular hole shape corresponding with the cross-sectional shape of said bearing section,
   said engagement protrusion is formed in a tapered shape that tapers in a radially outward direction from an outer diameter surface of said bearing section, and
   said engagement depression is formed in a tapered shape that tapers with increasing depth away from an opening positioned on an inner diameter surface of said engagement hole section.

17. The bearing support device according to claim 16, wherein
   said bearing hole has a circular hole shape corresponding with a cross-sectional shape of said rotor,
   two or more of said engagement protrusions and said engagement depressions are provided at positions outward from said bearing hole in a radial direction of said bearing hole and are located at predetermined intervals around a circumferential direction to surround said bearing hole, and
   when said engagement protrusions are fitted tightly into said engagement depressions, a center axis of said bearing hole is substantially aligned with the rotational center axis of said rotor.

* * * * *